United States Patent [19]

Taue

[11] Patent Number: 5,127,583
[45] Date of Patent: Jul. 7, 1992

[54] ACCUMULATOR TYPE INJECTION NOZZLE

[75] Inventor: Jun Taue, Iwata, Japan

[73] Assignee: Yamaha Hatsudoki Kabushiki Kaisha, Iwata, Japan

[21] Appl. No.: 556,234

[22] Filed: Jul. 20, 1990

[30] Foreign Application Priority Data

Jul. 21, 1989 [JP] Japan .................... 1-189333

[51] Int. Cl.⁵ ............... F02M 47/00; F02M 61/20
[52] U.S. Cl. ................... 239/96; 239/533.12;
239/585.3; 239/533.9; 239/124
[58] Field of Search ............ 239/96, 533.2, 533.3,
239/533.9, 533.12, 585, 533.8

[56] References Cited

U.S. PATENT DOCUMENTS

| | | | |
|---|---|---|---|
| 3,442,451 | 5/1969 | De Nagel | 239/96 |
| 3,669,354 | 6/1972 | Helyer | 239/533.2 X |
| 3,747,857 | 7/1973 | Fenne | 239/533.8 X |
| 4,442,978 | 4/1984 | Seifert | 239/533.9 X |
| 4,509,691 | 4/1985 | Skinner | 239/533.9 |
| 4,516,729 | 5/1985 | Füssner et al. | 239/533.9 X |
| 4,684,067 | 8/1987 | Cotter et al. | 239/533.8 X |
| 4,768,751 | 9/1988 | Giachino et al. | 239/102.1 X |
| 4,899,935 | 2/1990 | Yoshida et al. | 239/533.8 X |
| 4,993,636 | 2/1991 | Taue et al. | 239/533.8 X |
| 5,004,154 | 4/1991 | Yoshida et al. | 239/96 |

FOREIGN PATENT DOCUMENTS

| | | |
|---|---|---|
| 671686 | 1/1939 | Fed. Rep. of Germany .......... 239/533.12 |
| 3118485 | 11/1982 | Fed. Rep. of Germany .......... 239/533.12 |
| 79153 | 5/1985 | Japan .......... 239/533.12 |

*Primary Examiner*—Andres Kashnikow
*Assistant Examiner*—William Grant
*Attorney, Agent, or Firm*—Ernest A. Beutler

[57] ABSTRACT

An accumulator type fuel injector system including an arrangement for changing the bias on the injector valve as the pressure of the fuel increases so as to reduce the sensitivity of the device to pressure variations as may occur under low speed operation. In the embodiments, the arrangement for changing the bias comprises either an elastomeric or a coil spring that acts against the main biasing spring of the injector valve and which are responsive to pressure in the accumulator chamber. In addition, a tapered discharge port arrangement is incorporated for the injector nozzle so that proportionately greater amounts of fuel will be discharged as the lift of the injection valve increases.

12 Claims, 5 Drawing Sheets

ACCUMULATOR TYPE INJECTION NOZZLE

BACKGROUND OF THE INVENTION

This invention relates to a high pressure fuel injection unit for an engine and more particularly to an improved accumulator type injector nozzle for engines.

A popular and very effective type of injection nozzle for injecting fuel to an internal combustion engine is the so called "accumulator type". With this type of injection nozzle, there is provided an accumulator chamber in which fuel is stored under pressure and which can communicate with the engine through a discharge port. An injection valve is mounted within the accumulator chamber and controls the opening and closing of the discharge port. There is also provided a control chamber that receives fuel under pressure from the accumulator chamber and the injection valve has a portion that is supported within this control chamber. As a result, the control chamber pressure acts on the injection valve and assists in maintaining it in a closed position. A control valve selectively relieves the pressure in the control chamber. When this occurs, the pressure of the fuel in the accumulator chamber will cause the injection valve to open and fuel to be discharged. With this type of system, it is also the practice to employ a biasing spring that acts on the injector valve so as to urge it to its closed position in cooperation with the fuel pressure in the control chamber.

Although this type of injection nozzle is very effective, it is difficult at times to provide good running at low engine speeds such as idle. The reason for this is that at low pressures under low speed operation the amount of fuel discharged will increase significantly for a given increase in fuel pressure. This may be understood best by reference to FIG. 1 which is a graphical view showing the fuel pressure in the accumulator chamber in relation to the amount of fuel discharged during four varying running conditions, indicated by the curves a, b, c and d. The curves a, b, c and d indicate respectively increasing engine speeds with the curve a being idle speed and the curve d being wide open throttle, maximum engine speed. It can be seen that the curve a is quite sharp. Hence a small difference in fuel pressure in the accumulator chamber will make a substantial difference in the amount of fuel injected.

It is very difficult to control adequately the pressure of the fuel in the accumulator chamber at low engine speeds. This is because the fuel pressure changes with a number of variables primarily at temperature, which effects the viscosity.

In order to reduce these fluctuations in amount of fuel discharge at low engine speeds in response to pressure variations, it has been proposed to increase the biasing preload of the spring that cooperates with the pressure in the control chamber to hold the injection valve in its closed position. Although an increased spring preload will lessen the slope of the curves shown in FIG. 1, this gives rise to another problem. That is, at high engine speeds when the actual time duration of opening of the injection nozzle is quite short, it may be impossible to inject sufficient fuel so as to achieve maximum performance. Therefore, the previously proposed systems have not been effective in solving the aforenoted problem while at the same time maintaining maximum engine output.

It is, therefore, a principal object of this invention to provide an improved accumulator type injection nozzle.

It is a further object of this invention to provide an improved accumulator type injection nozzle that will provide good fuel control at low speeds even with pressure variations.

It is a further object of this invention to provide an improved accumulator type injection nozzle wherein the sensitivity of fuel discharge at low pressures is reduced without adversely effecting the amount of fuel which can be discharged at high pressures.

It is a further object of this invention to provide an improved arrangement for operating an accumulator type injection nozzle so as to cause smaller changes in fuel discharge with pressure changes under low pressure conditions than at high pressure conditions.

SUMMARY OF THE INVENTION

This invention is adapted to be embodied in an accumulator type injection nozzle comprising an accumulator chamber for containing fuel under pressure and a discharge port that communicates the accumulator chamber with an engine for injecting fuel thereto. An injection valve controls the communication to the accumulator chamber with the discharge port for controlling the discharge of fuel to the engine. A control chamber communicates with the accumulator chamber for receiving fuel under pressure therefrom and the injector valve has a portion received in the control chamber for urging the injection valve to its closed position under the influence of fuel pressure in the control chamber. A control valve is provided for selectively relieving the pressure in the control chamber to effect opening of the injection valve and the injection of fuel to the engine from the discharge port. Means are provided for increasing the amount of fuel injected in response to an incremental pressure differential in the accumulator chamber as the absolute pressure in the accumulator chamber increases so as to reduce the sensitivity of fuel discharge to pressure variations at low pressures.

DETAILED DESCRIPTION OF THE PREFERRED EMBODIMENTS OF THE INVENTION

Figure 3:
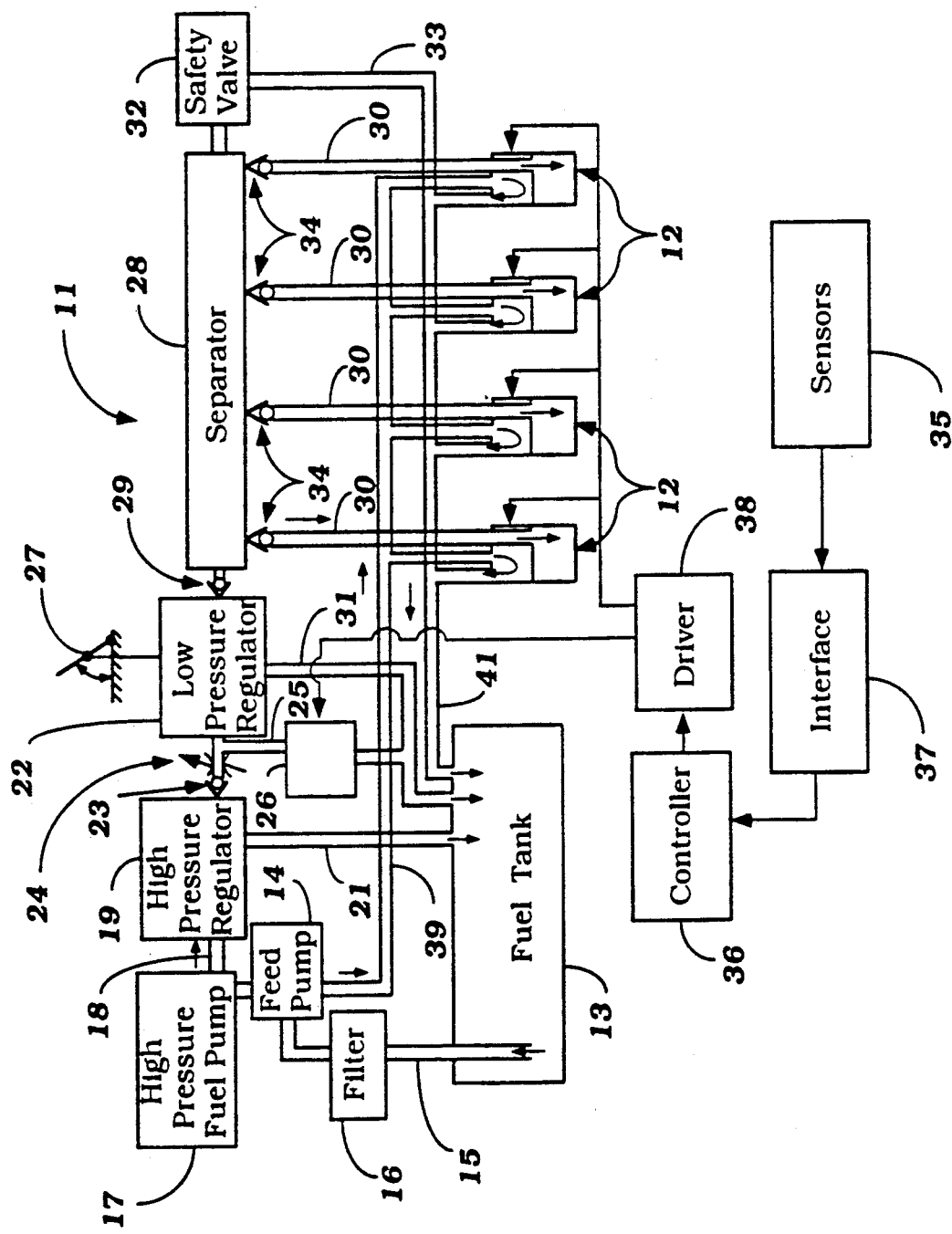
FIG. 3 is a schematic view showing a fuel injection system including fuel injectors constructed in accordance with an embodiment of the invention.

Referring first to FIG. 3 a fuel injection system for a high speed diesel engine incorporating fuel injectors constructed in accordance with an embodiment of the invention is identified generally by the reference numeral 11. The fuel injectors themselves are indicated generally by the reference numerals 12. Although the invention relates to the fuel injectors 12 per se, the construction of which will be described in more detail by reference to the remaining figures later, an understanding of the full system in which the invention may be employed will be helpful to enable those skilled in the art to practice the invention. It is to be understood, however, that the described system 11 is only a typical environment in which the invention may be employed and the injector nozzles 12, which form the subject matter of the invention, can be used in a wide variety of other systems and with other applications than high speed diesel engines.

The system 11 includes a fuel tank 13 from which fuel is drawn by a feed pump 14 through a conduit 15 in which a filter 16 is positioned. The feed pump 14 delivers the fuel to a high pressure pump 17 which, in turn, outputs the pressurized fuel through a conduit 18 to a high pressure regulator 19 that regulates maximum pressure in the system. This maximum pressure regulation is achieved by bypassing excess fuel back to the tank 13 through a return conduit 21.

The high pressure regulator 19 outputs the fuel to a low pressure regulator 22 through a conduit in which a check valve 23 and variable throttle 24 are positioned so as to absorb some of the pressure fluctuations in the system. Between the high pressure regulator 19 and the low pressure regulator 22, there is provided a bypass conduit 25 in which a pressure relief valve 26 is provided so as to relieve excess pressure in the conduit. interconnecting the high pressure regulator 19 and the low pressure regulator 22 once the engine is shut off.

The low pressure regulator 22 is a variable device that is controlled by an accelerator pedal 27 so as to control the fuel pressure in response to operator demand. Basically the low pressure regulator 22 operates to provide an increased pressure as the accelerator pedal 27 is depressed. The pressure regulation is achieved by bypassing excess fuel back to the tank 13 through a return line 31.

The low pressure regulator 22 delivers the regulated fuel to a vapor separator 28 through a line in which a check valve 29 is provided. The separator 28 then delivers fuel to the injection nozzles 12 and specifically to the accumulator chamber thereof, as will become apparent, through supply conduits 30.

There is further provided a safety valve 32 in the form of a pressure relief valve in the separator 28 so as to relieve excess pressure under abnormal conditions back to the fuel tank 13 through a return line 33. Further check valves 34 are provided in the lines between the vapor separator 28 and the injectors 12.

In addition to the operator accelerator pedal 27, the control for the injectors 12 includes a number of external sensors, indicated generally by the reference numeral 35 which sense various parameters such as engine speed, throttle opening, water temperature, oil temperature, fuel temperature, ambient temperature and so forth. These sensors 35 output their signals to a controller 36 through an interface 37. The controller 36 is programmed so as to operate a driver 38 that controls the individual solenoids (to be described) that operate the control valves of the injection nozzles 12 so as to control their discharge in accordance with any desired strategy. Also, the driver 38 operates to open the relief valve 26 when the engine is shut down so as to relieve the fuel pressure, as aforenoted.

The solenoids of the injectors 12 are also provided with a fuel cooling system. To this end, the feed pump 14 is provided with a cooling outlet 39 which circulates fuel to the cooling chambers of the injectors 12, as will be described. This fuel is then returned to the fuel tank 13 through a return conduit 41.

Figure 4:
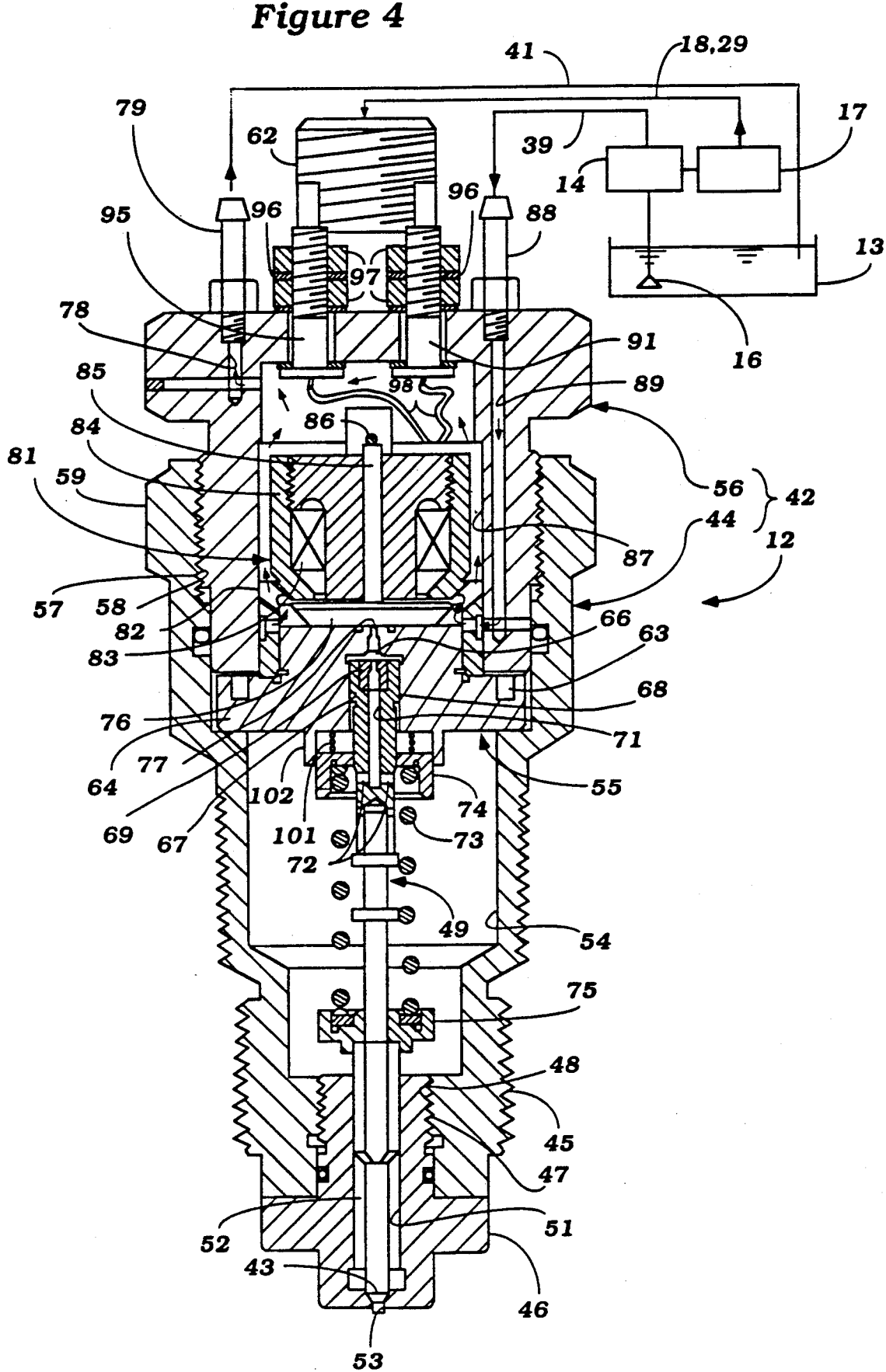
FIG. 4 is a cross sectional view taken through a fuel injector constructed in accordance with a first embodiment of the invention.
Figure 5:
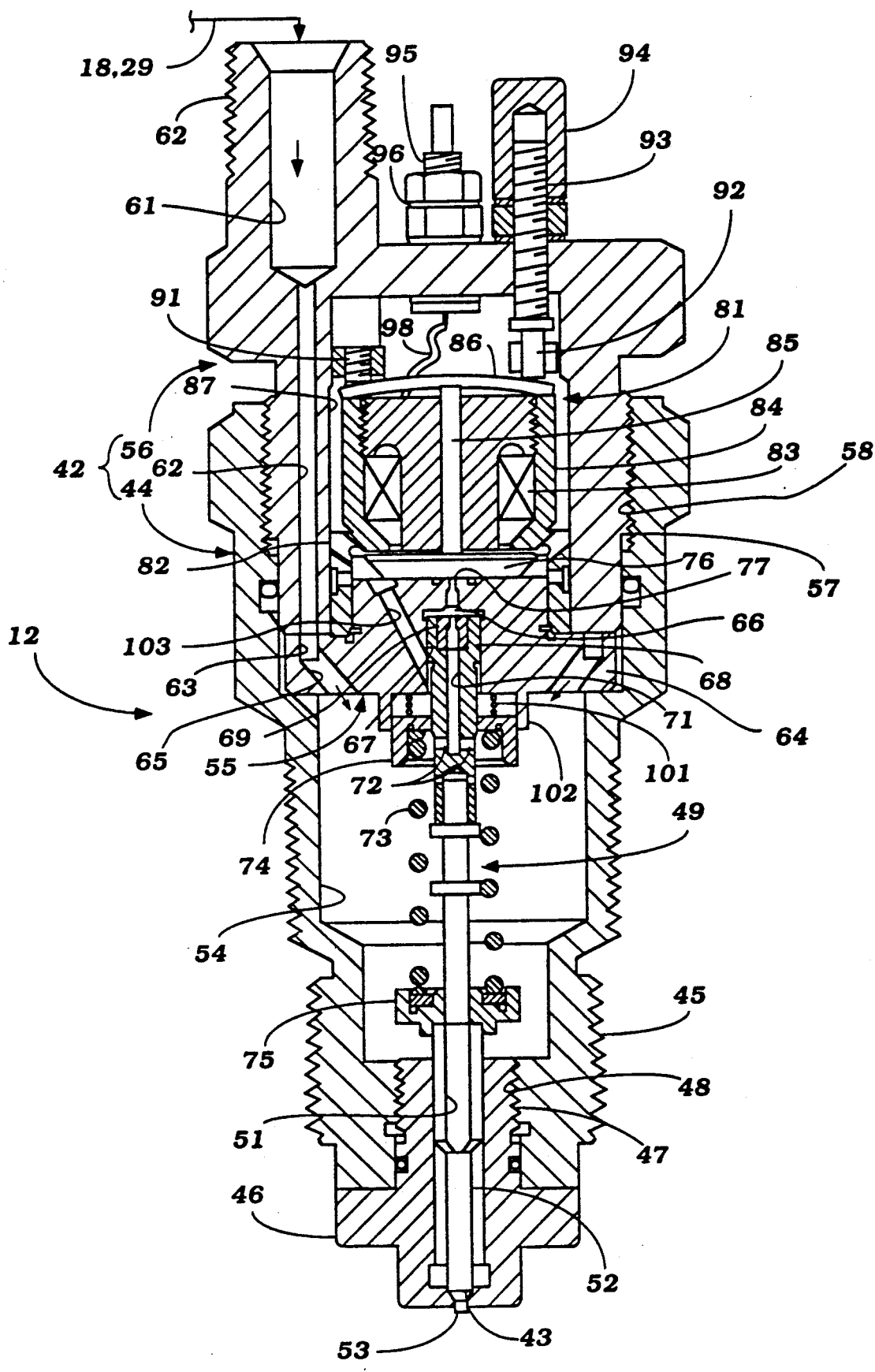
FIG. 5 is a cross sectional view of the fuel injector taken along a plane perpendicular to the plane of FIG. 4.
Figure 6:
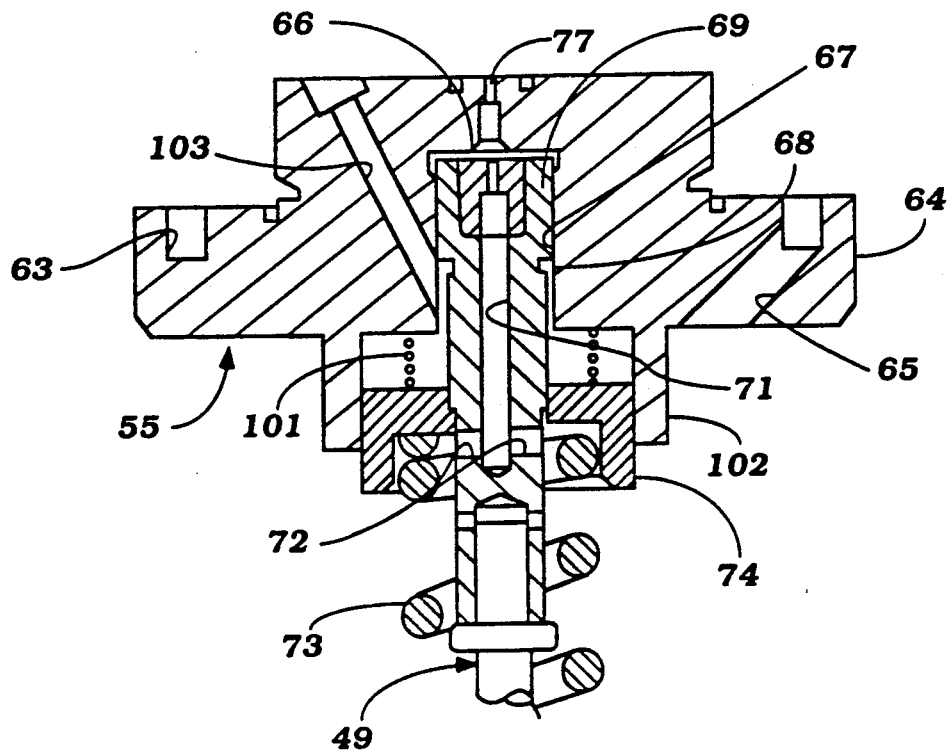
FIG. 6 is a further enlarged cross sectional view showing the control chamber and related components along the same plane as FIG. 5.

The construction of the individual injectors 12 and specifically a first embodiment thereof will now be made by reference to FIGS. 4 through 6. Certain components of the system as already described are shown schematically in FIGS. 4 and 5 for orientation purposes. Each injection nozzle 12 is comprised of an outer housing assembly, indicated generally by the reference numeral 42 that is adapted to be mounted, in a manner to be described, in the cylinder head of an internal combustion engine with a delivery port 43 communicating with the combustion chamber for delivering fuel to it in a manner to be described. Rather than direct cylinder injection, the invention may be utilized in conjunction with manifold injection systems but the invention has particular utility with direct injection, for example as used with high speed diesel engines.

The outer housing 42 is comprised of a lower piece 44 that has a threaded lower end 45 that is adapted to be threaded into a suitable aperture in the cylinder head of the associated engine (not shown) in a known manner. The delivery port 43 is defined by a tip 46 that has a threaded portion 47 that is received in a threaded bore 48 formed at the lower end of the housing piece 44.

An injection valve 49 is slidably supported within a bore 51 of the nozzle piece 46 and has a reduced diameter portion 52 and a flow controlling tip 53 which, in the closed position, closes the delivery port 43. The valve portion 52 has interrupted enlargements for slidably supporting the injection valve 49 in the bore 51 in a known manner.

An accumulator chamber 54 is formed above the bore 51 by the housing piece 44. The accumulator chamber 54 is closed at its upper end by means of a closure plate 55 that is held against a shoulder in the housing piece 44 by a second housing piece 56. The housing piece 56 has a threaded portion 57 that is received within a threaded bore 58 of the housing piece 44 so as to hold the closure plate 55 in position and maintain the chamber 54 in a sealed condition, except as is hereinafter noted. Externally of the threaded opening 58, the housing piece 44 is formed with a hexagonal portion 59 so as to facilitate its insertion into the threaded bore of the cylinder head.

The housing piece 56 is formed with an inlet conduit 61 that has a threaded external portion 62 so as to receive a fitting for connecting the supply line 30 extending from the vapor separator 28 to the inlet conduit 61.

The inlet conduit 61 (FIG. 5) which is generally a drilled opening, is intersected by a further drilled passageway 62 that extends axially along the housing piece 56 at one side thereof and which communicates at its lower end with a corresponding circumferential groove 63 formed in the upper face of a cylindrical portion 64 of the closure plate 55. The groove 62 is intersected by a bore 65 which extends into the accumulator chamber 54 for delivering fuel under pressure to the accumulator chamber 54.

A control chamber 66 is formed in the closure plate 55 by means of a bore 67 that opens through the lower end of the closure plate 55. The injection valve 49 has a generally cylindrical actuator portion 68 that is slidably supported within the bore 67 and which closes the lower end of the control chamber 66. A restricted orifice 69 fixed in the end of the actuator portion 68 communicates an axial passage 71 of the portion 68 and radial ports 72 with the accumulator chamber 54. The control chamber 66 communicates with the orifice 69 to receive the pressurized fuel and normally urge the injection valve 49 toward its downward or closed position.

A coil compression spring 73 encircles the injection valve 49 and bears against a retainer plate 74 at its upper end. The lower end of the spring 73 engages a cup shaped retainer 75 that is held axially in position against a shoulder formed by an enlargement on the injection valve 49 so as to further assist in maintaining the injection valve 49 in the closed position as shown in the drawings. The retainer plate 74 is preloaded, in a manner to be described, so as to provide a variable closing force on the injector valve 49 so as to tailor the delivery of the fuel from the delivery port 43 and to make the device less sensitive to pressure fluctuations in the accumulator chamber 54 under low pressure conditions as will be described hereinafter.

A control valve 76 is supported within the upper end of the closure plate 55 and controls the opening of a control valve port 77 formed in the upper end of the closure plate 55 and communicating with the control chamber 43. The control valve 76 comprises a headed portion that also acts as an armature plate. The control valve 76 is biased toward its closed position with the control valve port 77 in a manner to be described.

The control valve 76 when opened will permit the fuel in the control chamber 66 to return to the tank 13 through a return passageway 78 that extends axially through the end of the housing piece 56 parallel to the inlet passageway 62. The return passageway 78 communicates with the conduit 41 through a fitting 79. Fuel can flow from the control valve port 77 to the return passageway 78 through suitable internal passageways or clearances to permit this return flow, which is relatively small in volume.

The control valve 76 is opened and closed so as to control discharge of fuel for the delivery port 43 by means of an electromagnetic assembly, indicated generally by the reference numeral 81. This electromagnetic assembly 81 includes a generally cylindrical yoke 82 that has an opening at an enlarged diameter lower end portion which is received on a cylindrical portion of the closure plate 55 so as to secure the electromagnetic assembly 81 in position.

The electromagnetic assembly 81 is comprised of a solenoid coil or winding 83 that is disposed at the lower end of a housing or yoke 84 which encircles an armature and is integrally formed with the yoke 82. The armature is formed with a bore that slidably supports a plunger 85 of the control valve 76. A leaf type spring 86 is carried by the yoke 84 and bears against the upper end of the plunger 85 for urging the control valve 76 to its closed position.

It should be noted that the yoke 84 has a smaller diameter than the corresponding bore 87 of the housing piece 56 so as to define a clearance therebetween which acts as a cooling jacket around the solenoid winding 83.

As has been previously noted, fuel is circulated through this cooling jacket from the low pressure feed pump 14 through the conduit 39. The conduit 39 communicates with a fitting 88 affixed to the housing piece 56 and communicates with a conduit 89 formed therein for delivering fuel to this cooling jacket. The fuel thus circulated is returned through the passage 78 and fitting 79 which, as has been noted, also returns the fuel that is dumped from the control chamber 66 when the control valve 76 is opened.

The tension of the spring 86 is adjusted by means of a fixed stop pin 91 (FIG. 5) that engages one end of the leaf spring 86 and an adjustable stop 92 that engages the other end. The adjustable stop 92 has a threaded portion 93 that is threaded into a lock nut assembly 94 for adjusting the preload on the spring 86.

The circuit for energizing the coil 83 of the electromagnet assembly 81 for opening the control valve 76 includes a pair of terminal posts 95 that extend through the upper end of the hosing piece 56 with electrical tab connectors 96 which are held on the posts 95 in electrical contact with them between a respective pair of nuts 97 so as to afford attachment to an appropriate lead of a circuit with the driver 38. Wires 98 are connected to the posts 91 to complete the connection to the winding 83.

The condition shown in the figures is that which occurs when the winding 83 is deenergized. When the winding 83 is deenergized, the control valve 76 will be held in its closed position by the spring 86 so that the accumulator chamber 54 and control chamber 66 may be pressurized.

At the appropriate instant for fuel injection to begin, which may be controlled in any suitable strategy, the winding 83 is energized. When this happens, the relief valve armature 76 will be attracted upwardly by the flux in the armature of the solenoid 81 so as to urge the valve portion 85 upwardly and open the control valve 76 against the action of the spring 86. The pressure in the control chamber 66 will then be rapidly depleted and the higher pressure of the fuel acting in the accumulator chamber 54 will urge the injection valve 49 upwardly and permit fuel to issue from the discharge port 43. When the fuel pressure in the accumulator chamber 54 has been depleted, the spring 73 will move the injection valve 49 to its closed position and the fuel pressure can then build up in the accumulator chamber 54. This action is initiated by discontinuing the energization of the winding 83 so as to close the control valve 76 and permit pressure in the control chamber 66 to again build up.

The construction of the injector 12 as thus far described may be considered to be that of a conventional construction. However, as has been previously noted, the fixed preload of the spring 73 gives rise to an operation that provides large variations in the amount of fuel discharged at low speeds in response to minor pressure fluctuations which cannot be completely dampened out of the system. In order to avoid this fluctuation, an arrangement is provided so that the preload of the spring 73 is varied in response to the actual pressure within the accumulator chamber 79. This is achieved by providing a light biasing spring 101, the rate of which may be appropriately controlled that acts between the lower face of the closure portion 64 and the retainer 74.

The closure plate 55 is provided with a cylindrical extension 102 in which the retainer plate 74 is slidably supported. This forms a chamber which contains the biasing spring 101. This chamber is vented back to the return through the cooling chamber by means of a passageway 103 (FIGS. 5 and 6) that extends through the closure plate 55.

Figure 1:
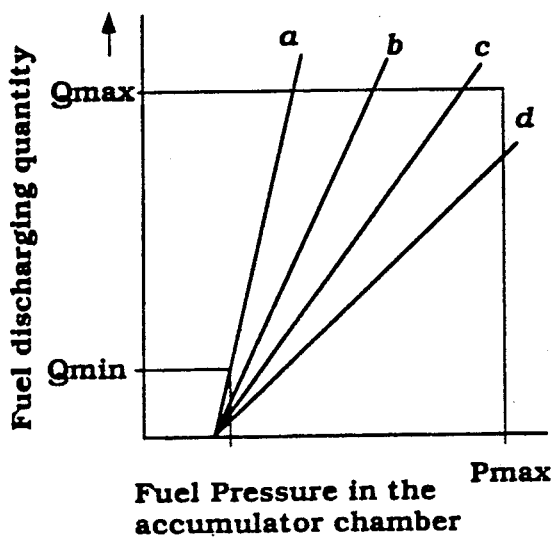
FIG. 1 is a graphic view showing the amount of fuel discharged in relation to fuel pressure in the accumulator chamber in accordance with the prior art type of constructions.
Figure 2:
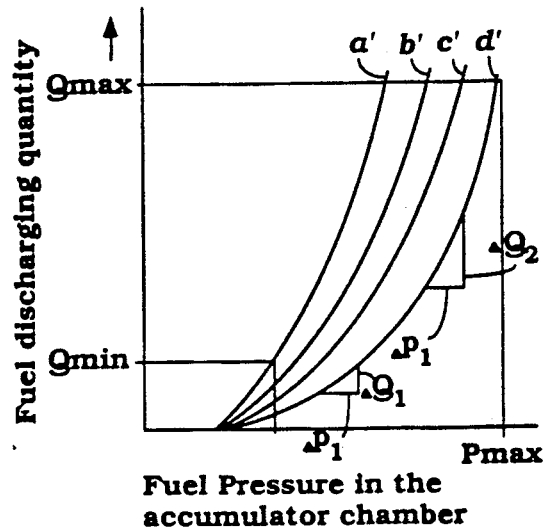
FIG. 2 is a graphical view, in part similar to FIG. 1, and shows the fuel discharge characteristics in response to fuel pressure in the accumulator chamber in accordance with the embodiments of this invention.

As a result of this construction, the pressure of the fuel within the accumulator chamber 54 will act upon the retainer 74. As the pressure increases, the spring 101 will be deflected and the preload on the spring 73 will be reduced. The effect of this operation may be seen in FIG. 2 wherein the curves a', b', c' and d' indicate the amount of fuel discharged in response to the pressure in the accumulator chamber 54 at the various speed conditions. It will be seen that these curves have a gradual slope at lower fuel pressures and increase to the normal slope at high fuel pressures. As a result, at lower fuel pressures the incremental amount of fuel discharged $\Delta Q_1$ for an incremental amount of increased pressure $\Delta P$ will be less than the higher pressures. As a result, the system will be less sensitive to fluctuations in fuel pressure at low fuel pressures than at high fuel pressures. Thus better stability at low speed running can be achieved.

Figure 7:
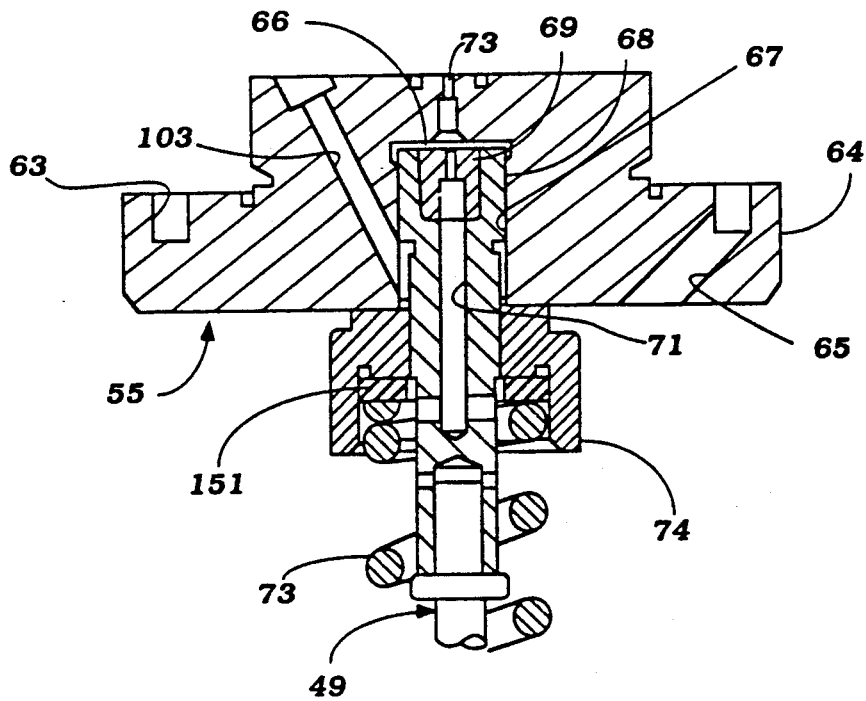
FIG. 7 is a cross sectional view, in part similar to FIG. 6, and shows another embodiment of the invention.

FIG. 7 shows another embodiment which can give this same type of result. In this embodiment, the retainer 74 is abuttingly engaged with the underside of the closure plate 55. However, in this embodiment, an elastomeric ring 151 is interposed between the upper end of the coil spring 73 and the retainer 74. The elastomeric ring 151 will be deflected in an amount determinative upon the pressure in the accumulator chamber 54 and, accordingly, will vary the preload on the spring 73 as in the previously described embodiment. However, the elastomeric ring is not as linear a device as the coil compression spring of the previously described embodiment.

Figure 8:
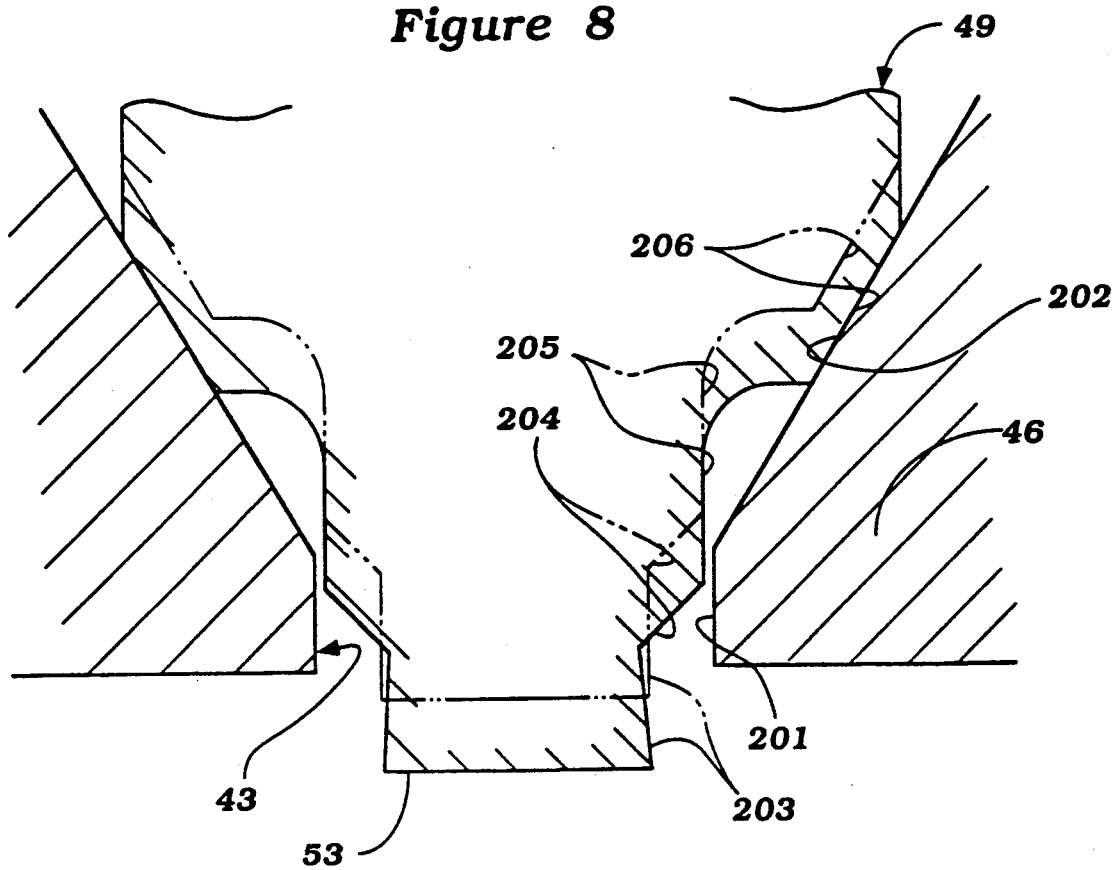
FIG. 8 is an enlarged cross sectional view of the discharge port and associated injection valve in accordance with another feature of the invention.

FIG. 8 shows an arrangement whereby the tip portion 53 of the injector valve 49 and discharge port 43 can be configured so as to further control the amount of fuel so that lesser amounts of fuel are delivered at low speeds and low fuel pressures and greater amounts are delivered at high speeds and high fuel pressures. As seen herein, the delivery port, which is indicated generally by the reference numeral 43 is provided with a first cylindrical opening portion 201 which is formed at the base of a conical section 202. The injection valve tip portion 53 is, on the other hand, provided with a cylindrical portion 203 that has a smaller diameter than the port portion 201 and a first tapered control portion 204 that is formed at the base of a cylindrical portion 205 that has a diameter complimentary to the diameter of the port portion 201. The tip 53 has a further tapered control portion 206 that is complementary to the taper of the conical portion 202.

As may be seen in the phantom line view of FIG. 8, when the injection valve 49 opens slightly, the cylindrical portion 205 will move clear of the cylindrical portion 201 of the delivery nozzle 43. Thus a small metered flow of fuel will be possible. However, as the valve 49 lifts to a greater extent, as occurs when higher fuel pressures are supplied to the accumulator chamber 54, the flow control will be by the less restrictive tapered portion 206 cooperating with the nozzle portion 202. As a result, the curves can be still further tailored to improve the fuel control and reduce the pressure sensitivity at low speeds and low fuel pressures while as to permit a greater fuel flow under high pressure conditions.

It should be readily apparent from the foregoing description that the described constructions are extremely effective in insuring that the injectors will provide well metered quantities of fuel for idle and low speed operation without restricting the amount of fuel flow at high speed high load conditions. It is also to be understood that the previously described embodiments are preferred embodiments of the invention and that various changes and modifications may be made, without departing from the spirit and scope of the invention, as defined by the appended claims.

What is claimed is:

1. An accumulator type injection nozzle comprising an accumulator chamber for containing fuel under pressure, a discharge port for communicating said accumulator chamber with an engine for injecting fuel thereto, an injector valve for controlling the communication of said accumulator chamber with said discharge port for controlling the discharge of fuel to said engine, a control chamber communicating with said accumulator chamber for receiving fuel under pressure therefrom, said injector valve having a portion received in said control chamber for urging said injector valve to its closed position under the influence of fuel pressure in said control chamber, control valve means for sequentially relieving the pressure in said control chamber to achieve opening of said injector valve and the injection of fuel to said engine from said discharge port, and means for providing a curvilinear increase in the amount of fuel injected as the pressure in said accumulator chamber increases, such that the incremental amount of fuel injected in response to a given incremental pressure differential increase in said accumulator chamber increases as the pressure in said accumulator chamber at which said given incremental pressure differential increase occurs increases.

2. An accumulator type injection nozzle as set forth in claim 1 further including biasing spring means for urging the injector valve to its closed position.

3. An accumulator type injection nozzle as set forth in claim 2 wherein the means for providing the curvilinear increase in the amount of fuel injected comprises means increasing the biasing force of the biasing spring means urging the injector valve to its closed position at low pressures and reducing the biasing force thereon at high pressures.

4. An accumulator type injection nozzle as set forth in claim 3 wherein the means increasing and reducing the biasing force of the biasing spring means changes the preload on the biasing spring means.

5. An accumulator type injection nozzle as set forth in claim 4 wherein the injector valve and the delivery port have cooperating areas configured to provide a lesser incremental degree of change of fuel flow upon a first range of degrees of incremental movement of the injector valve and a greater incremental change of fuel flow in response to a second range of incremental degree of movement of the injector valve.

6. An accumulator type injection nozzle as set forth in claim 3 wherein the means increasing and reducing the biasing force of the biasing spring means comprises a further spring and a pressure responsive member interposed between said further spring and the biasing spring means and exposed to the pressure in the accumulator chamber for compressing the further spring upon increased pressure in the accumulator chamber.

7. An accumulator type injection nozzle as set forth in claim 6 wherein the further spring comprises a coil spring.

8. An accumulator type injection nozzle as set forth in claim 7 wherein the injector valve and the delivery port have cooperating areas configured to provide a lesser incremental degree of change of fuel flow upon a first range of degrees of incremental movement of the injector valve and a greater incremental change of fuel flow in response to a second range of incremental degrees of movement of the injector valve.

9. An accumulator type injection nozzle as set forth in claim 3 wherein the means increasing and reducing the biasing force of the biasing spring means comprises a pressure responsive elastomeric element interposed between the biasing spring means and a retainer.

10. An accumulator type injection nozzle as set forth in claim 9 wherein the injector valve and the delivery port have cooperating areas configured to provide a lesser incremental degree of change of fuel flow upon a first range of degrees of incremental movement of the injector valve and a greater incremental change of fuel flow in response to a second range of incremental degrees of movement of the injector valve.

11. An accumulator type injection nozzle as set forth in claim 1 wherein the means for providing the curvilinear increase in the amount of fuel injected in response to an incremental pressure differential increase comprises the injector valve and the delivery port cooperating to provide a lesser incremental degree of change of fuel flow upon a first range of degrees of incremental movement of said injector valve and a greater incremental change of fuel flow in response to a second range of incremental degrees of movement of said injector valve.

12. An accumulator type injection nozzle as set forth in claim 11 wherein the delivery port comprises a cylindrical section communicating with the engine and a conical section communicating with the accumulator chamber, the injector valve having a first cylindrical portion smaller in diameter than the delivery port cylindrical portion and a second cylindrical portion of complementary diameter to the delivery port cylindrical portion, said first and second injector valve cylindrical portions being connected by a first conical portion, said injector valve having a second conical portion of said delivery port when said injector valve is closed, said first conical portion of said injector valve controlling the flow during the first range of movement of the injector valve and said second conical portion controlling the flow during the second range of movement of the injector valve.

* * * * *